(12) United States Patent
Polosajian

(10) Patent No.: US 12,294,810 B2
(45) Date of Patent: May 6, 2025

(54) VEHICLE CAMERA SYSTEM AND METHOD OF OPERATING THE SAME

(71) Applicant: Leo Polosajian, Reseda, CA (US)

(72) Inventor: Leo Polosajian, Reseda, CA (US)

( * ) Notice: Subject to any disclaimer, the term of this patent is extended or adjusted under 35 U.S.C. 154(b) by 97 days.

(21) Appl. No.: 18/061,208

(22) Filed: Dec. 2, 2022

(65) Prior Publication Data

US 2024/0187547 A1    Jun. 6, 2024

(51) Int. Cl.
| | |
|---|---|
| *H04N 5/77* | (2006.01) |
| *B60R 11/04* | (2006.01) |
| *H04N 23/51* | (2023.01) |
| *B60R 11/00* | (2006.01) |

(52) U.S. Cl.
CPC ............ *H04N 5/772* (2013.01); *B60R 11/04* (2013.01); *H04N 23/51* (2023.01); *B60R 2011/0035* (2013.01); *B60R 2011/0068* (2013.01); *B60R 2011/0071* (2013.01); *B60R 2011/0077* (2013.01); *B60R 2011/0082* (2013.01); *B60R 2011/0085* (2013.01)

(58) Field of Classification Search
CPC .......... H04N 5/77; H04N 5/772; H04N 23/51; B60R 1/04
USPC ........................................ 348/118, 120, 61
See application file for complete search history.

(56) References Cited

U.S. PATENT DOCUMENTS

| | | | | |
|---|---|---|---|---|
| 2008/0239077 A1* | 10/2008 | Kurylo | ...................... | H04N 7/18 348/148 |
| 2010/0040361 A1* | 2/2010 | Schuetz | .................. | H04N 23/90 396/428 |
| 2011/0169637 A1* | 7/2011 | Siegler, II | ............ | G08B 29/188 340/541 |
| 2013/0057396 A1* | 3/2013 | Winslow | ................. | B60R 25/33 340/426.19 |
| 2014/0176605 A1* | 6/2014 | Gibson | ................ | H04N 17/002 345/633 |
| 2016/0072987 A1* | 3/2016 | Schüz | ..................... | H04N 23/51 348/148 |
| 2020/0273359 A1* | 8/2020 | Stetson | ................. | H04L 65/403 |
| 2024/0134033 A1* | 4/2024 | Wyne | ...................... | G01S 13/60 |

* cited by examiner

*Primary Examiner* — Daquan Zhao
(74) *Attorney, Agent, or Firm* — Womble Bond Dickinson (US) LLP

(57) ABSTRACT

A camera system for a vehicle includes a camera having a housing defining an interior space, a memory device in the interior space, a processor in the interior space coupled to the memory device, a lens exposed on an exterior of the housing, an image sensor in the interior space coupled to the memory device, and a sensor coupled to the processor. The camera system also includes an attachment mechanism configured to secure the camera system to the vehicle. The camera is configured to move between a closed position and an open position. The memory device includes instructions configured to cause the processor to determine the camera is in the open position in response to an output signal by the sensor, and to cause the camera system to record the video captured by the image sensor in response to the camera being in the open position.

17 Claims, 5 Drawing Sheets

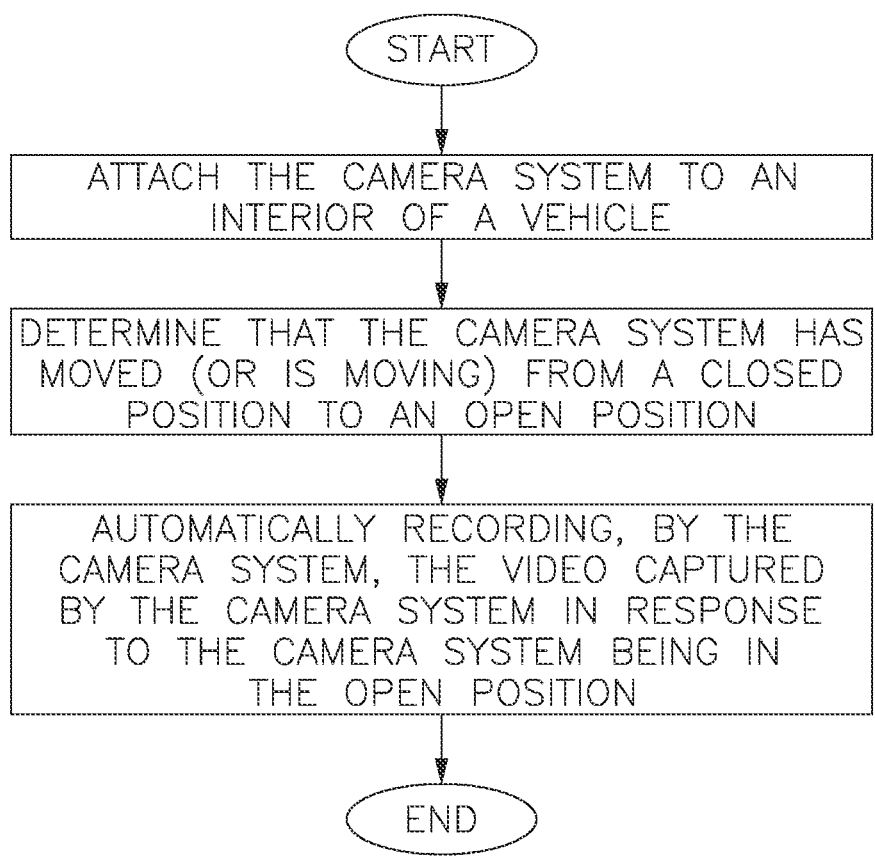

VEHICLE CAMERA SYSTEM AND METHOD OF OPERATING THE SAME

BACKGROUND

1. Field

The present application relates to various embodiments of a vehicle camera system and methods of operating the same.

2. Description of the Related Art

Encounters between civilians and police officers are increasingly being recorded. For instance, police officers commonly wear body cameras that may be activated during an interrogation, and arrest, or a traffic stop. However, such body cameras are not reliably activated, may become dislodged from the officer's person, and may not be oriented properly to record the entire interaction between the civilian and the officer. Additionally, civilians are increasingly recording such encounters with police officers with their cell phones. However, recording an encounter with a police officer with a smart phone may be considered non-compliance with the officer's commands and therefore it may escalate the situation. Additionally, a smart phone would not be able to capture the incident if the civilian operating the smart phone is arrested.

SUMMARY

The present disclosure relates to various embodiments of a vehicle camera system. In one embodiment, the vehicle camera system includes a camera including a housing defining an interior space, a non-volatile memory device in the interior space, a processor in the interior space coupled to the memory device, a lens exposed on an exterior of the housing, an image sensor in the interior space coupled to the memory device and configured to capture video, and a sensor coupled to the processor. The camera system also includes an attachment mechanism coupled to the camera that is configured to secure the camera system to the vehicle. The camera is configured to move between a closed position and an open position. The memory device includes instructions which, when executed by the processor, cause the processor to determine the camera is in the open position in response to an output signal by the sensor. The memory device also includes instructions which, when executed by the processor, cause the camera system to record the video captured by the image sensor in response to the determination that the camera is in the open position.

The camera may be hingedly coupled to the attachment mechanism, and the camera may be configured to rotate relative to the attachment mechanism between the closed position and the open position.

The sensor may include a switch. The switch may be at an interface between the camera and the attachment mechanism such that the switch is depressed when the camera is in the open position. The switch may be on the housing or the attachment mechanism such that the switch is depressed when the camera is in the closed position.

The sensor may include a first electrical contact on the housing and a second electrical contact on the attachment mechanism. The first electrical contact may be in contact with the second electrical contact when the camera is in the open position, and the first electrical contact may not be in contact with the second electrical contact when the camera is in the closed position.

The sensor may be an angle sensor configured to measure an angle between the camera and the attachment mechanism. The instructions stored in the memory device, when executed by the processor, may cause the processor to determine that the camera is in the open position in response to the angle exceeding a threshold angle.

The camera may be fixedly coupled to the attachment mechanism.

The sensor may include an accelerometer configured to measure acceleration of the camera.

The sensor may include a gyroscope configured to measure angular velocity of the camera.

The attachment mechanism may include a visor clip configured to be connected to a visor of the vehicle.

When the camera system is coupled to the visor, the lens may be oriented in a widthwise direction of the visor.

The attachment mechanism may include a suction cup, a stand with an adhesive base, and/or a strap.

The camera may also include a network adapter coupled to the image sensor. Instructions stored in the memory device, when executed by the processor, may cause the camera system to transmit the video, via the network adapter, to a remote electronic device.

The instructions, when executed by the processor, may cause the camera system to store the video locally on the memory device.

The present disclosure also relates to various methods of recording video from a driver's side of a vehicle. In one embodiment, the method includes attaching the camera system to an interior of a vehicle, moving the camera system from a closed position to an open position, and automatically recording the video captured by the camera system in response to the camera system being in the open position.

The attachment mechanism may include a visor clip, and the task of attaching the camera system to the interior of the vehicle may include clipping the visor clip to a visor of the vehicle.

Moving the camera system from the closed position to the open position may include rotating the visor of the vehicle.

Moving the camera system from the closed position to the open position may include rotating the camera relative to the attachment mechanism.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 5 is a flowchart illustrating tasks of a method of operating a camera system according to one embodiment of the present disclosure.

DETAILED DESCRIPTION

Aspects of the present disclosure relate to various embodiments of a vehicle camera system. The vehicle camera system may be installed in any suitable location in the interior of the vehicle, such as the driver-side visor, the A-pillar, or the dashboard, such that the vehicle camera system is positioned to record video out of the drive-side window to record video of encounters with, for example, police officers during a traffic stop. In one or more embodiments, the vehicle camera system is configured to move between a closed position in which the vehicle camera system is not capturing or recording video, and an open position which the vehicle camera system is capturing and recording video. The vehicle camera system may utilize a variety of different sensor(s) to automatically determine that the vehicle camera system has moved from the closed position to the open position, such as a switch, an accelerometer, a gyroscope, electrical contacts, and/or an angle sensor. In this manner, the vehicle camera system of the present disclosure is configured to enable recording of an encounter or incident (e.g., a traffic stop) without having to use a smart phone, which may escalate the encounter and would not capture video of the encounter if the civilian is arrested.

Figure 1:
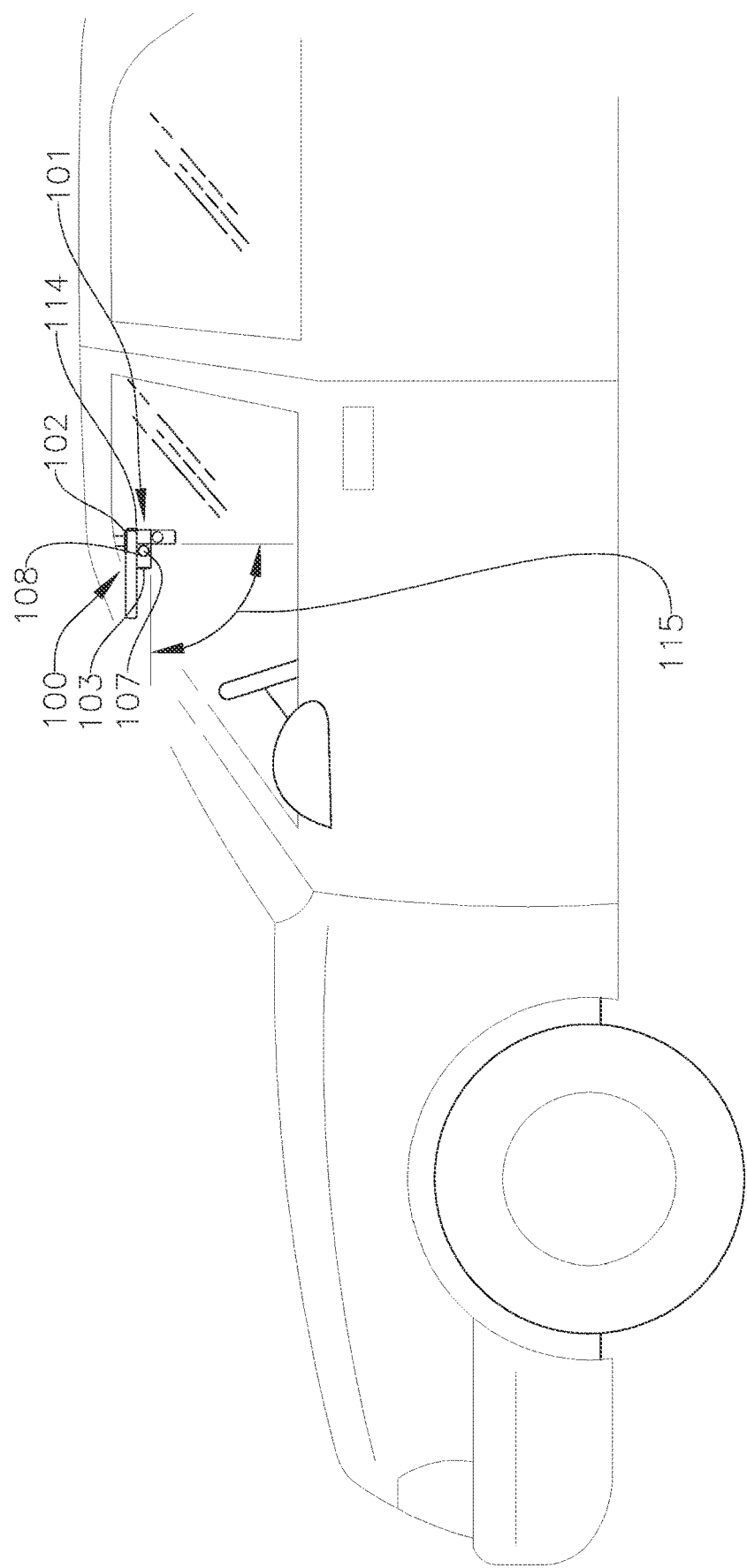
FIG. 1 is a side view of a camera system according to one embodiment of the present disclosure attached to a vehicle in a closed position and an open position.
Figure 2:
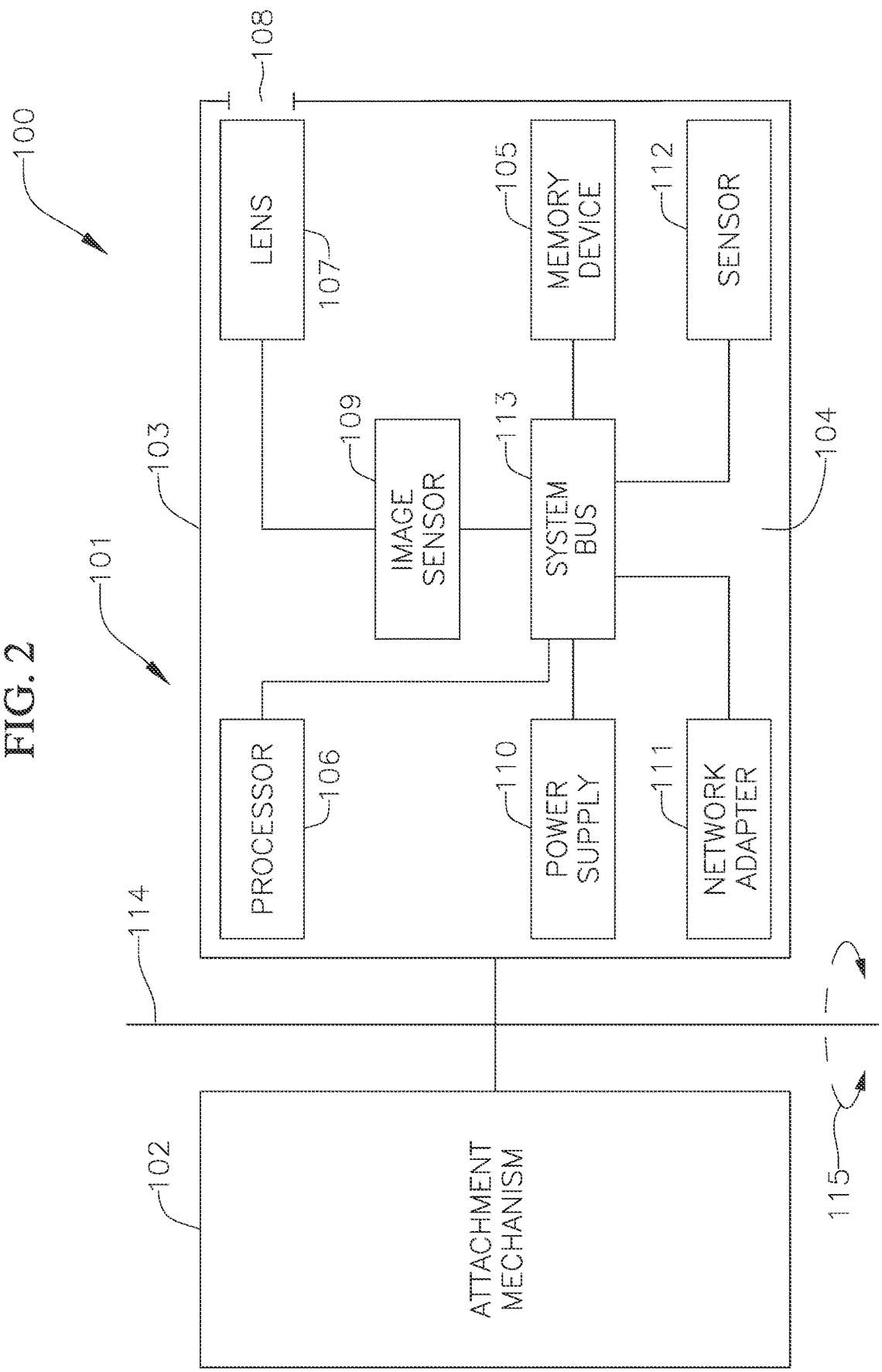
FIG. 2 is a schematic block diagram of the camera system according to the embodiment illustrated in FIG. 1.

With reference now FIGS. 1-2, a vehicle camera system 100 according to one embodiment of the present disclosure includes a camera 101 and an attachment mechanism 102 coupled to the camera 101. In the illustrated embodiment, the camera 101 includes a body or housing 103 defining an interior space 104, a memory device 105 (e.g., a non-volatile memory device, such as flash memory) in the interior space 104, a processor 106 in the interior space 104, a lens 107 exposed on an exterior of the housing 103 through an opening 108 in the housing 103, an image sensor 109 in the interior space 104 that is coupled to the lens 107, a power supply 110 (e.g., a rechargeable battery and/or a cable configured to connect to an external power supply, such as a power bank or the in-car cigarette lighter), a network adapter 111 (e.g., a WiFi chip or a Bluetooth™ chip) in the interior space 104, and at least one sensor 112 in the interior space 104. In the illustrated embodiment, the memory device 105, the processor 106, the image sensor 109, the power supply 110, the network adapter 111, and the sensor 112 may be in communication with each other over a system bus 113. In one or more embodiments, the memory device 105, the image sensor 109, the power supply 110, the network adapter 111, and the sensor 112 may be in communication with each other via the processor 106.

The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured, i.e., hard-wired, to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example, a processor may include two processors, an FPGA and a CPU, interconnected on a PWB.

In the illustrated embodiment, the attachment mechanism 102 is a visor clip configured to secure the vehicle camera system 100 to a visor in the vehicle (e.g., the driver-side visor). In the illustrated embodiment, when the visor clip 102 of the vehicle camera system 100 is attached to the visor on the driver-side of the vehicle, the lens 107 of the camera 101 is oriented (pointed) out of the interior of the vehicle through the driver-side window (e.g., the lens 107 of the camera 101 is oriented laterally along the width-wise direction of the visor). In one or more embodiments, the attachment mechanism 102 may have any other configuration suitable for securing the vehicle camera system 100 to the interior of the vehicle, such as hook and loop type fasteners, a stand having a base with adhesive, and/or one or more suction cups. Additionally, in one or more embodiments, the attachment mechanism 101 may be configured to be secured to any other suitable portion of the interior of the vehicle such that the camera 101 can capture video through the drive-side window of the vehicle, such as the A-pillar of the vehicle, the windshield of the vehicle, or the dashboard of the vehicle.

Additionally, in the illustrated embodiment, the camera 101 is rotatably coupled to the visor clip 102 by a hinge 114 such that the camera 101 is configured to rotate (arrow 115) between a closed position in which the vehicle camera system 100 is not recording and/or not capturing video, and an open position in which the vehicle camera system 100 is capturing and recording video.

The sensor 112 is configured to output a signal to the processor 106 in response to the camera 101 moving into the open position shown in FIG. 1. The memory device 105 includes computer-executable (i.e., computer readable) instructions which, when executed by the processor 106, cause the processor 106 to determine that the vehicle camera system 100 is in the open position in response to the signal output from the sensor 112. Additionally, the executable instructions, when executed by the processor 106, cause the processor 106 to send a signal causing the image sensor 109 to capture video from the lens 107 in response to the signal output from the sensor 112 indicating that the camera 101 is in the open position. In one or more embodiments, the executable instructions, when executed by the processor 106, cause the memory device 105 to record the video captured by the lens 107 and the image sensor 109. In one or more embodiments, the executable instructions, when executed by the processor 106, cause the network adapter 111 to transmit (e.g., wirelessly transmit) the video captured by the lens 107 and the image sensor 109 to a remote electronic device (e.g., a server (i.e., the "cloud"), a desktop computer, or a mobile electronic device, such as a laptop computer, a tablet computer, a smartphone, or a wearable electronic device, such as a smart watch), where the video may be recorded or otherwise stored for later replay.

In one or more embodiments, the sensor 112 may be a switch (e.g., a button). In one or more embodiments, the sensor 112 may be located at the interface (e.g., the hinge 114) between the housing 103 and the visor clip 102 such that the switch 112 is depressed when the camera 101 is in the open position and the switch 112 is not depressed when the camera 101 is in the closed position. In one or more embodiments, the switch 112 may be on the housing 103 of the camera 101 or on the visor clip 101 such that the switch 112 is depressed when the camera 101 is in the closed position (e.g., the switch 112 is sandwiched between the camera 101 and the visor clip 102) and the switch 112 is not depressed when the camera 101 is in the open position. Accordingly, in one or more embodiments, the instructions stored in the memory device 105, when executed by the processor 106, may cause the processor 106 to determine that the camera 101 is in the open position when the switch 112 is depressed or when the switch 112 is not depressed depending on the configuration of the switch 112 (e.g., depending on the location of the switch 112 relative to the visor clip 102 and the camera 101).

In one or more embodiments, the sensor 112 may be an accelerometer configured to measure the acceleration of the camera 101. In one or more embodiments, the instructions stored in the memory device 105, when executed by the processor 106, may cause the processor 106 to determine that the camera 101 is in the open position (or moving into the open position) in response to the acceleration (as measured by the accelerometer 112) exceeding a predetermined threshold acceleration that indicates that the camera 101 is moving into the open position. In one or more embodiments, the threshold acceleration may be approximately 1 inch/sec² or more.

In one or more embodiments, the sensor 112 may be a gyroscope configured to measure the angular velocity of the camera 101. In one or more embodiments, the instructions stored in the memory device 105, when executed by the processor 106, may cause the processor 106 to determine that the camera 101 is in the open position (or moving into the open position) in response to the angular velocity (as measured by the gyroscope 112) exceeding a predetermined threshold angular velocity that indicates that the camera 101 is moving into the open position. In one or more embodiments, the threshold angular velocity may be approximately ½ π radians/second or more.

In one or more embodiments, the sensor 112 may include at least one electrical contact (e.g., a first set of electrical contacts) on the housing 103 and at least one electrical contact (e.g., a second set of electrical contacts) on the attachment mechanism 102 (e.g., the visor clip). In one or more embodiments, the electrical contacts are located at an interface (e.g., the hinge 114) between the camera 101 and the attachment mechanism 102 such that the electrical contacts are in contact with each other when the camera 101 is in the open position and the electrical contacts are not in contact with each other when the camera 101 is in the closed position. In one or more embodiments, the instructions stored in the memory device 105, when executed by the processor 106, may cause the processor 106 to determine that the camera 101 is in the open position when a circuit is completed by the contacts (i.e., the contacts are in contact with each other) and to determine that he camera 101 is in the closed position when the circuit is broken (i.e., the contacts are separated from each other). In one or more embodiments, the electrical contacts are located at an interface between the camera 101 and the attachment mechanism 102 such that the electrical contacts are in contact with each other when the camera 101 is in the closed position, and the electrical contacts are not in contact with each other when the camera 101 is in the open position. In one or more embodiments, the instructions stored in the memory device 105, when executed by the processor 106, may cause the processor 106 to determine that the camera 101 is in the closed position when a circuit is completed by the contacts (i.e., the contacts are in contact with each other) and to determine that he camera 101 is in the open position when the circuit is broken (i.e., the contacts are separated from each other).

In one or more embodiments, the sensor 112 may be an angle sensor configured to measure an angle between the camera 101 and the attachment mechanism 102. In one or more embodiments, the instructions stored in the memory device 105, when executed by the processor 106, may cause the processor 106 to determine that the camera 101 is in the open position (or moving into the open position) when the angle between the camera 101 and the attachment mechanism 102 (as measured by the angle sensor 112) exceeds a predetermined threshold angle that indicates that the camera 101 is in (or moving into) the open position. In one or more embodiments, the threshold angle may be 90 degrees or greater than 90 degrees, such as in a range from approximately 90 degrees to approximately 135 degrees.

In this manner, the vehicle camera system 100 is configured to enable recording of an encounter or incident (e.g., a traffic stop) by simply rotating the camera 101 relative to the attachment mechanism 102 (e.g., the visor clip), which is less likely to escalate the encounter compared to recording the incident with a smart phone.

Figure 3:
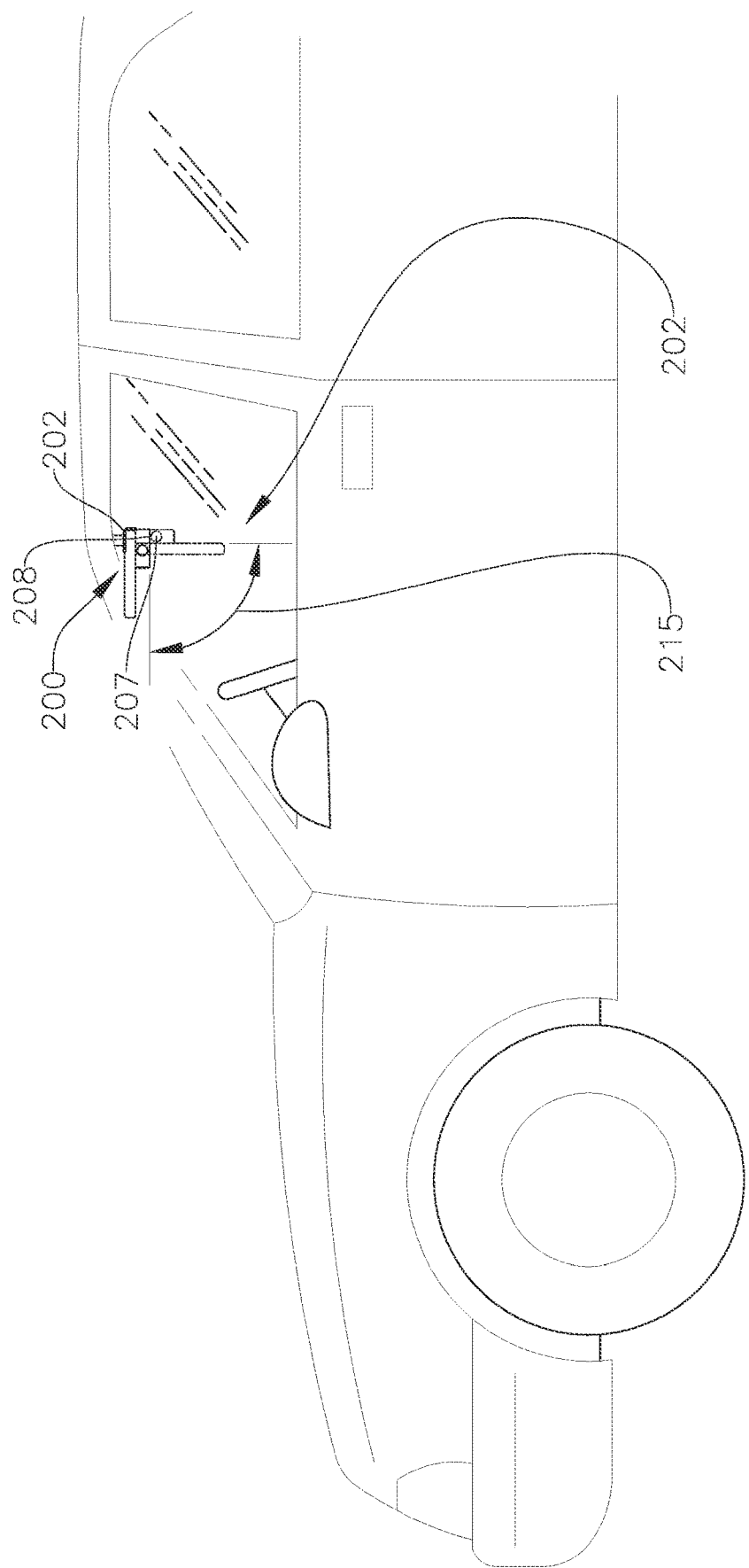
FIG. 3 is a side view of a camera system according to another embodiment of the present disclosure attached to a vehicle in a closed position and an open position.
Figure 4:
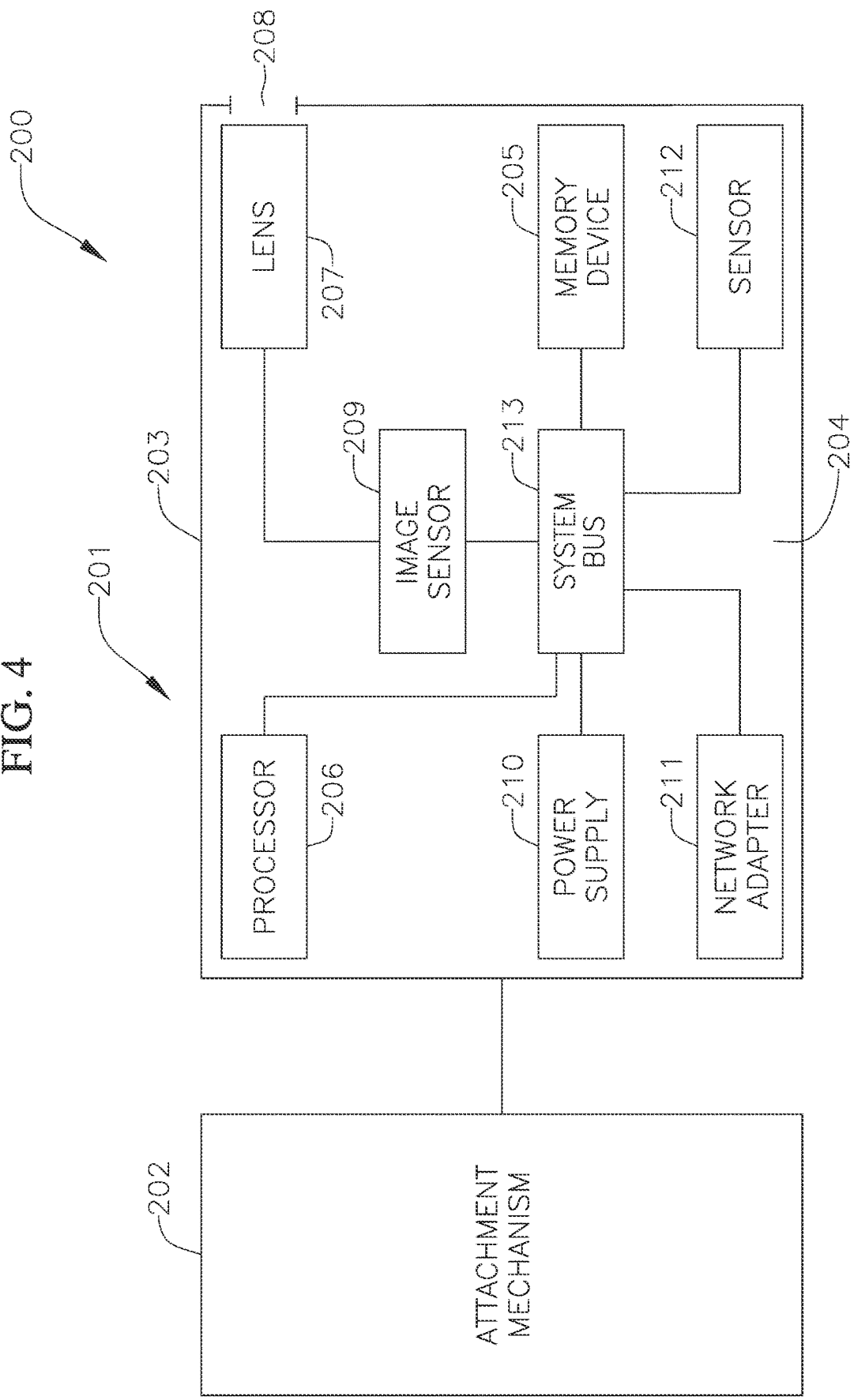
FIG. 4 is a schematic block diagram of the camera system according to the embodiment illustrated in FIG. 2.

In one or more embodiments, the camera may not be hingedly coupled to the attachment mechanism (e.g., the camera may be fixedly coupled to the attachment mechanism). FIGS. 3 and 4 depict an embodiment of a vehicle camera system 200 including a camera 201 and an attachment mechanism 202 in which the camera 201 is not hingedly or rotatably coupled to the attachment mechanism 202 (e.g., the camera 201 is fixedly coupled to the attachment mechanism 202). The camera 201 may be the same as or similar to the embodiment of the camera 102 illustrated in FIGS. 1-2 (e.g., the camera 201 includes a body or housing 203 defining an interior space 204, a memory device 205 in the interior space 204, a processor 206 in the interior space 204, a lens 207 exposed on an exterior of the housing 203 through an opening 208 in the housing 203, an image sensor 209 in the interior space 204 that is coupled to the lens 207, a power supply 210, a network adapter 211 in the interior space 204, at least one sensor 212 in the interior space 204, and a system bus 213 in the interior space 204 through which the memory device 205, the processor 206, the image sensor 209, the power supply 210, the network adapter 211, and the sensor 212 are in communication with each other).

In the illustrated embodiment in which the attachment mechanism 202 is a visor clip and the camera 201 is not hingedly coupled to the visor clip 202 (e.g., the camera 201 is fixedly coupled to the visor clip 202), the sensor 212 may be configured to measure or determine that the camera 201 is in the open position based upon the rotation of the visor in the vehicle downward. For instance, in one or more embodiments, the sensor 212 may be an accelerometer and/or a gyroscope configured to measure the acceleration of the camera 201 and/or the angular velocity, respectively, of the camera 201 based on the rotation of the visor, to which the vehicle camera system 200 is attached, downward. In one or more embodiments, the instructions stored in the memory device 205, when executed by the processor 206, may cause the processor 206 to determine that the camera 201 is in the open position (or moving into the open position) when the acceleration (as measured by the accelerometer 212) exceeds a predetermined threshold acceleration and/or the angular velocity (as measured by the gyroscope 212) exceeds a predetermined angular velocity that indicates that the camera is moving into the open position due to the downward rotation of the visor. In one or more embodiments, the threshold angular velocity may be approximately ½ π radians/second or more. In one or more embodiments, the threshold acceleration may be approximately 1 inch/sec$^2$ or more. In this manner, the vehicle camera system 200 is configured to enable recording of an encounter or incident (e.g., a traffic stop) by simply rotating the car visor downward, which is less likely to escalate the encounter compared to recording the incident with a smart phone.

FIG. 5 is a flowchart illustrating tasks of a method 300 of operating recording a video with a camera system (e.g., the camera system 100 illustrated in FIGS. 1-2 or the camera system 200 illustrated in FIGS. 3-4) according to one embodiment of the present disclosure. In the illustrated embodiment, the method 300 includes a task 310 of attaching the camera system to an interior of a vehicle. The task 310 may include securing the camera system to a visor of the vehicle, such as with a visor clip, one or more straps, adhesive, hook-and-loop fasteners, and/or any other suitable attachment mechanism or device. In one or more embodiments, the task 310 may include securing the camera system to a windshield, an A-pillar, a dashboard, or any other suitable portion of the vehicle with one or more suction cups, hook-and-loop fasteners, a stand with an adhesive base, and/or any other suitable attachment mechanism or device of the camera system.

In the illustrated embodiment, the method 300 also includes a task 320 of determining that the camera system has moved (or is moving) from a closed position to an open position. In one or more embodiments, a user may move the camera system from the closed position into the open position by rotating the camera relative to the attachment mechanism or by rotating the vehicle visor downward. In one or more embodiments, the task 320 may include determining the camera system has moved (or is moving) into the open position in response to a switch (e.g., a button) being depressed, a switch being released, electrical contacts forming a circuit, electrical contacts breaking a circuit, an angle between the camera and the attachment mechanism (as determined by an angle sensor) exceeding a threshold angle, an acceleration of the camera (as determined by an accelerometer of the camera system) exceeding a threshold acceleration, and/or an angular velocity of the camera (as determined by a gyroscope of the camera systems) exceeding a predetermined threshold angular velocity.

In the illustrated embodiment, the method 300 also includes a task 330 of automatically recording, by the camera system, the video captured by the camera system in response to the camera system being in the open position as determined in task 320. In one or more embodiments, the task 330 may include recording the video locally on the memory of the camera system, and/or the task 330 may include transmitting, via a network adapter, the video to a remote electronic device, such as a server (i.e., the "cloud"), a desktop computer, or a mobile electronic device, such as a laptop computer, a tablet computer, a smartphone, or a wearable electronic device, such as a smart watch) where the video may be recorded or otherwise stored for later replay.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, and equivalents thereof.

What is claimed is:

1. A camera system for a vehicle, the camera system comprising:
   a camera comprising:
      a housing defining an interior space;
      a non-volatile memory device in the interior space;
      a processor in the interior space coupled to the memory device;
      a lens exposed on an exterior of the housing;
      an image sensor in the interior space coupled to the memory device and configured to capture video; and
      a sensor coupled to the processor, the sensor being selected from the group consisting of an accelerometer configured to measure acceleration of the camera and a gyroscope configured to measure angular velocity of the camera; and
   an attachment mechanism coupled to the camera configured to secure the camera system to the vehicle,
   wherein the camera is configured to move between a closed position and an open position,
   wherein the memory device includes instructions which, when executed by the processor, cause the processor to determine the camera is in the open position in response to the acceleration exceeding a threshold acceleration or the angular velocity exceeding a threshold angular velocity, and
   wherein the memory device includes instructions which, when executed by the processor, cause the camera system to automatically record the video captured by the image sensor in response to the determination that the camera is in the open position.

2. The camera system of claim 1, wherein the camera is hingedly coupled to the attachment mechanism, and wherein the camera is configured to rotate relative to the attachment mechanism between the closed position and the open position.

3. The camera system of claim 2, wherein the sensor comprises a switch.

4. The camera system of claim 3, wherein the switch is at an interface between the housing and the attachment mechanism, wherein the switch is depressed when the camera is in the open position.

5. The camera system of claim 3, wherein the switch is on the housing or the attachment mechanism, and wherein the switch is depressed when the camera is in the closed position.

6. The camera system of claim 1, wherein the camera is fixedly coupled to the attachment mechanism.

7. The camera system of claim 1, wherein the attachment mechanism comprises a visor clip configured to be connected to a visor of the vehicle.

8. The camera system of claim 7, wherein, when the camera system is coupled to the visor, the lens is oriented in a widthwise direction of the visor.

9. The camera system of claim 1, wherein the attachment mechanism is selected from the group consisting of at least one suction cup, a stand with an adhesive base, and at least one strap.

10. The camera system of claim 1, wherein the camera further comprises a network adapter coupled to the image sensor, and wherein the instructions, when executed by the processor, cause the camera system to transmit the video, via the network adapter, to a remote electronic device.

11. The camera system of claim 1, wherein the instructions, when executed by the processor, cause the camera system to store the video locally on the memory device.

12. A method of recording video from a driver's side of a vehicle, the method comprising:
   attaching the camera system of claim 1 to an interior of a vehicle;
   moving the camera system from a closed position to an open position; and
   automatically recording the video captured by the camera system in response to the camera system being in the open position.

13. The method of claim 12, wherein the attachment mechanism comprises a visor clip, and wherein the attaching the camera system to the interior of the vehicle comprises clipping the visor clip to a visor of the vehicle.

14. The method of claim 13, wherein the moving the camera system from the closed position to the open position comprises rotating the visor of the vehicle.

15. The method of claim 12, wherein the moving the camera system from the closed position to the open position comprises rotating the camera relative to the attachment mechanism.

16. A camera system for a vehicle, the camera system comprising:
   a camera comprising:
      a housing defining an interior space;
      a non-volatile memory device in the interior space;
      a processor in the interior space coupled to the memory device;
      a lens exposed on an exterior of the housing;
      an image sensor in the interior space coupled to the memory device and configured to capture video; and
      a sensor coupled to the processor; and
   an attachment mechanism coupled to the camera configured to secure the camera system to the vehicle,
   wherein the camera is configured to move between a closed position and an open position,
   wherein the memory device includes instructions which, when executed by the processor, cause the processor to determine the camera is in the open position in response to an output signal by the sensor, and
   wherein the memory device includes instructions which, when executed by the processor, cause the camera system to record the video captured by the image sensor in response to the determination that the camera is in the open position,
   wherein the camera is hingedly coupled to the attachment mechanism,
   wherein the camera is configured to rotate relative to the attachment mechanism between the closed position and the open position, and
   wherein the sensor comprises a first electrical contact on the housing and a second electrical contact on the attachment mechanism, wherein the first electrical contact is in contact with the second electrical contact when the camera is in the open position, and wherein the first electrical contact is not in contact with the second electrical contact when the camera is in the closed position.

17. A camera system for a vehicle, the camera system comprising:
   a camera comprising:
      a housing defining an interior space;
      a non-volatile memory device in the interior space;
      a processor in the interior space coupled to the memory device;
      a lens exposed on an exterior of the housing;
      an image sensor in the interior space coupled to the memory device and configured to capture video; and
      a sensor coupled to the processor; and
   an attachment mechanism coupled to the camera configured to secure the camera system to the vehicle,
   wherein the camera is configured to move between a closed position and an open position,
   wherein the memory device includes instructions which, when executed by the processor, cause the processor to determine the camera is in the open position in response to an output signal by the sensor, and
   wherein the memory device includes instructions which, when executed by the processor, cause the camera system to record the video captured by the image sensor in response to the determination that the camera is in the open position,
   wherein the camera is hingedly coupled to the attachment mechanism,
   wherein the camera is configured to rotate relative to the attachment mechanism between the closed position and the open position, and p1 wherein the sensor is an angle sensor configured to measure an angle between the camera and the attachment mechanism, and wherein the instructions stored in the memory device, when executed by the processor, cause the processor to determine the camera is in the open position in response to the angle exceeding a threshold angle.

* * * * *